United States Patent [19]
Cohen

[11] Patent Number: 5,691,872
[45] Date of Patent: Nov. 25, 1997

[54] SINGLE LINE, MULTIPLE LINE TELECOMMUNICATIONS SURGE PROTECTOR

[75] Inventor: Richard L. Cohen, Novato, Calif.

[73] Assignee: Panamax Corporation, San Rafael, Calif.

[21] Appl. No.: 654,596

[22] Filed: May 29, 1996

[51] Int. Cl.$^6$ .................................................. H01C 7/12
[52] U.S. Cl. ............................ 361/119; 361/56; 361/111; 379/331
[58] Field of Search ................. 361/119, 56, 118, 361/120, 111; 379/331–332; 439/218, 638–639, 676, 701

[56] References Cited

U.S. PATENT DOCUMENTS

| | | | |
|---|---|---|---|
| 4,438,477 | 3/1984 | Cawley | 361/119 |
| 4,626,057 | 12/1986 | Knickerbocker | 439/353 |
| 4,743,999 | 5/1988 | Hames | 361/56 |
| 4,944,698 | 7/1990 | Siemon et al. | 439/676 |
| 5,377,067 | 12/1994 | Tanaka et al. | 361/104 |
| 5,423,697 | 6/1995 | MacGregor | 439/638 |
| 5,483,409 | 1/1996 | Heidorn et al. | 361/119 |
| 5,488,535 | 1/1996 | Masghati et al. | 361/119 |

OTHER PUBLICATIONS

Model 343B In-Range Out-of-Building (IROB) Protector, CIB 3141: Installation Instructions, PEC 32918, AT&T, Copyright 1991.

*Primary Examiner*—Jeffrey A. Gaffin
*Assistant Examiner*—Michael J. Sherry
*Attorney, Agent, or Firm*—Limbach, Limbach, LLP

[57] ABSTRACT

A surge protection circuit having x protected paths, a first input connector connected to all x of the protected paths and a second input connector connected to fewer than x of the protected paths. For example, the second input connector may be connected to x/2 of the protected paths. Using different modular jack connections, it is possible to use the surge protection circuit to protect either one line of x wires (paths), or two lines of x/2 wires.

13 Claims, 5 Drawing Sheets

5,691,872

SINGLE LINE, MULTIPLE LINE TELECOMMUNICATIONS SURGE PROTECTOR

BACKGROUND OF THE INVENTION

The present invention relates to telecommunication line surge protectors. More specifically, the present invention relates to a surge protector which provides surge protection for one telecommunications line having some number x of wires, or which alternatively provides surge protection for more than one telecommunications line, each having less than n wires. The present invention also relates to a surge protector which can provide surge protection for an 8-wire telecommunications line, or for two 4-wire telecommunications lines.

DESCRIPTION OF THE RELATED ART

Telecommunications lines are subject to accidental electrical surges. Such surges are conditions of abnormally high current and/or voltage. Surges can be caused by lightning and or short circuits. A surge can cause permanent damage to devices, such as telephone sets, which are connected to the telecommunications line.

A typical telecommunications line includes at least two discrete wires. However, many telecommunications lines contain more than two wires. For instance, telecommunications lines having four or eight wires are common. The wires in a telecommunications line are generally organized in pairs, so there is generally an even number of wires in a telecommunications line.

Conventionally, when surge protection is provided for a 2-wire telecommunications line, a surge protector designed to protect a 2-wire telecommunications line is utilized. For a 4-wire telecommunications line, a 4-wire telecommunications line surge protector is used, and so on.

This is a limit on the versatility of conventional telecommunications line surge protectors. For applications where telecommunications lines having various numbers of wires are used, various different telecommunications line surge protectors must be stocked. This can increase inventory costs.

Also, if the telecommunications line is subject to change, then the surge protector must be changed when the telecommunications line changes. For instance, if an 8-wire telecommunications line is replaced by two 4-wire telecommunications line, the 8-wire telecommunications line surge protector must be removed and replaced by two 4-wire telecommunications line surge protectors. This type of replacement can increase installation time and cost.

SUMMARY OF THE INVENTION

It is an object of the present invention to provide a telecommunications surge protector which can be alternatively used with a telecommunications line having some number of wires x, or with more than one telecommunications line each having fewer than x wires. It is an object of the present invention to provide a telecommunications line surge protector which is more versatile because it can be used with telecommunications lines having different numbers of wires.

According to the present invention, a telecommunications line surge protector includes a first input connector, a second input connector, and a surge protection circuit. The surge protection circuit has x protected paths. The first input connector is connected to all x paths. The second output connector is connected to y protected paths some subset y of the x protected paths.

For example, one embodiment of a telecommunications surge protector according to the present invention has 8 protected paths. The first input connector is connected to all 8 paths and the second input connector is connected to 4 of the 8 protected paths. This embodiment of the present invention can protect either one 8-wire line (connected to the first input connector) or two 4-wire lines (respectively connected to the first and second input connectors).

DETAILED DESCRIPTION OF THE PREFERRED EMBODIMENTS

Figure 1:
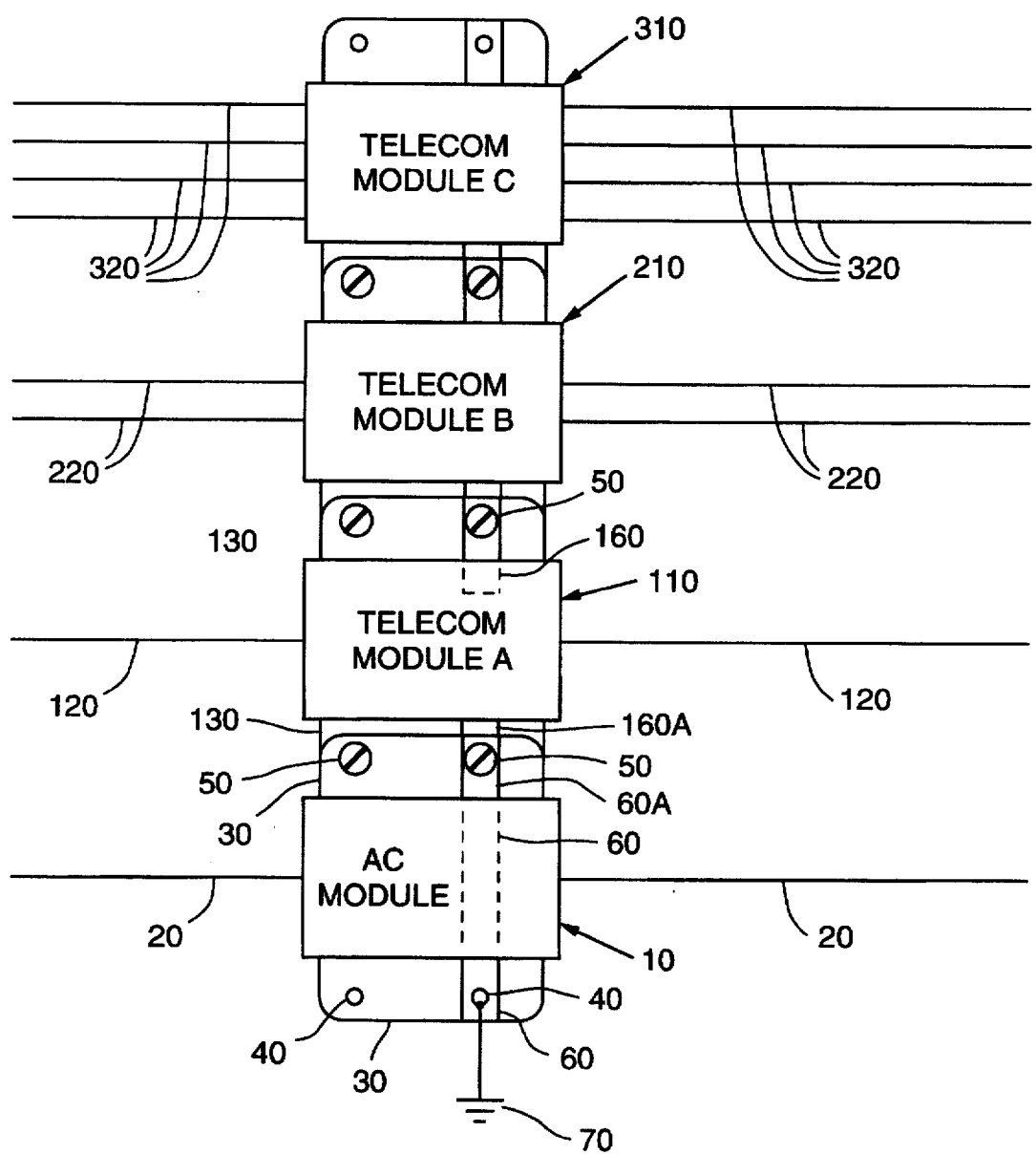
FIG. 1 shows an assembly of surge protection modules wherein several of the modules are telecommunications line modules embodying the present invention.

FIG. 1 shows an assembly of surge protection modules 10, 110, 210, 310.

AC surge protection module 10 is an AC surge protector, which provides surge protection for AC power line 20. AC surge protection module 10 has two ears 30, 30. Each ear 30 has two screw holes 40, 40. Using screws 50, the AC surge protection module can be mechanically connected to a surface and/or connected to ears on other modules. In the assembly shown in FIG. 1, AC surge protection module 10 is connected to telecommunications protection module A by two screws 50.

AC module 10 is grounded by a grounding strip 50, which is electrically connected to an electrical ground 70. When AC module 10 is a primary protector, the ground 70 may be a building ground wire. For secondary surge protection applications, the ground 70 may be the ground wire of an AC outlet.

Grounding strip 60 runs through AC module 10. The surge protection circuitry (not shown) of AC module 10 is connected to this grounding strip to provide grounding. Portions of the grounding strip 60a extend onto each ear 30 in the vicinity of one of the screw holes, as shown. In this way, when additional modules are added to the assembly, grounding strips of adjacent modules are electrically connected to the grounding strip 60, and are thereby electrically connected to the ground 70 thereby. In the assembly shown in FIG. 1, a portion of the grounding strip 160a of adjacent telecommunications protection module A is electrically connected to grounding strip 60, and thereby electrically connected to the ground 70. It is noted that other grounding schemes are also possible. For instance, each module of the assembly could be separately connected to a grounding wire which is external to the modules.

Telecommunications protection module A 110 is a telecommunications surge protector according to the present invention. Telecommunications protection module A can provide surge protection for a one 8-wire telecommunications line. Alternatively, telecommunications protection module A can provide surge protection for two 4-wire telecommunications lines. Alternatively, telecommunications protection module A can provide surge protection for four 2-wire telecommunications lines. In the assembly shown in FIG. 1, telecommunications protection module A is connected to a single 8-wire telecommunications line 120, and provides surge protection for the 8-wire telecommunications line 120.

Telecommunications protection module A 110 has two ears 130, which are similar to the ears 30 described above in connection with AC protection module 10. The ears 130, 130 can be used with screws 50 to provide for detachable mechanical connection to other modules. The ears 130, 130 of telecommunications protection module 110 are detachably connected to adjacent modules 10 and 210 in the assembly shown in FIG. 1. As explained above, grounding for telecommunications module A is provided through a grounding strip 160 which runs through telecommunications protection module A 110.

Figure 2:
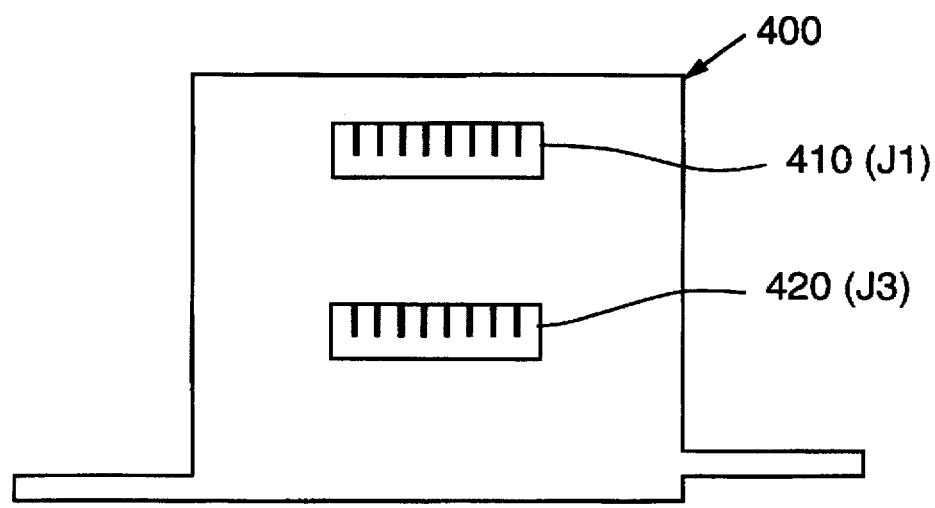
FIG. 2 shows a telecommunications line surge protection module according to the present invention.

Telecommunications module B 210 is identical to telecommunications module A 110. As shown in FIG. 2, telecommunications module B 210 provides surge protection for two 4-wire telecommunications lines 220.

Telecommunications module C 310 is identical to telecommunications module A 110. As shown in FIG. 2, telecommunications module C 310 provides surge protection for four 2-wire telecommunications lines 320.

Because telecommunications modules A, B and C 110, 210, 310 are identical, only one model of telecommunications protector needs to be purchased and inventoried to provide protection for 8-wire, 4-wire and 2-wire telecommunications line. Furthermore, if, for instance, 8-wire telecommunications line 120 were to be replaced by one or two 4-wire telecommunications lines, telecommunications protection module 110 could be utilized, and would not need to be replaced or scrapped. This can save on installation time and cost.

Because the telecommunications modules can be detachably connected to each other, modules can be easily added or removed from the assembly depending on the number of telecommunications lines which need surge protection.

FIG. 2 shows a telecommunications surge protector according to the present invention. The telecommunications protection module 400 has two RJ-45/11 modular jacks 410, 420 which serve as input connectors for connecting telecommunications lines to the telecommunications protection module 400. The opposite side of telecommunications surge protector 400 also has two RJ-45/11 modular jacks which respectively serve as output connectors for the telecommunications lines connected to the input connectors 410 and 420. The RJ-45/11 can be connected to either 8-wire telecommunications lines and 4-wire telecommunications lines.

The telecommunications protection module 400 can alternatively provide surge protection for one 8-wire telecommunications line connected through input connector 410, or provide surge protection for two 4-wire lines, respectively connected through input connectors 410 and 420.

Although it is mechanically possible to connect 8-wire telecommunications lines to both input connectors 410 and 420, this should be avoided because the telecommunications protection module cannot reliably provide protection for two 8-lines, and also because short circuiting of the telecommunications lines may occur in this case. The reasons for this are further explained in connection with FIG. 4.

Figure 3:
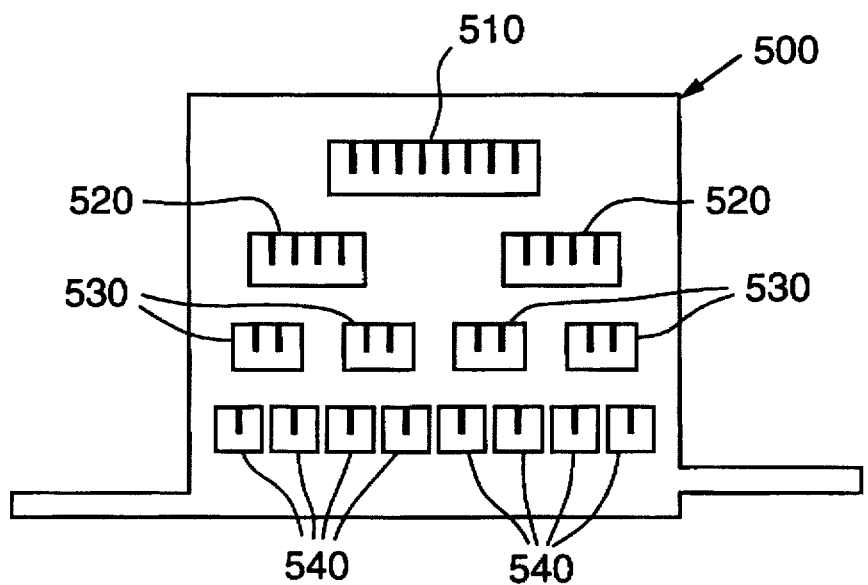
FIG. 3 shows another embodiment of a telecommunications line surge protection module according to the present invention.

FIG. 3 shows another embodiment of a telecommunications surge protector according to the present invention. Telecommunications surge protection module 500 has one 8-wire input connector 510, two 4-wire input connectors 520, four 2-wire input connectors 530, and eight 1-wire input connectors 540. Telecommunications protection module 500 can provide surge protection for one or more telecommunications lines, having up to 8 wires in the aggregate.

For example, telecommunications protection module 500 can provide protection for one 4-wire telecommunications line, and 2-wire telecommunications lines. However, because the surge protection circuit (not shown) in telecommunications protection module 500 may have only 8 separate protected paths, care must be taken to connect the telecommunications lines to telecommunications protection module 500, so that the wires of each of the 3 telecommunications lines utilize separate protected paths.

Figure 4:
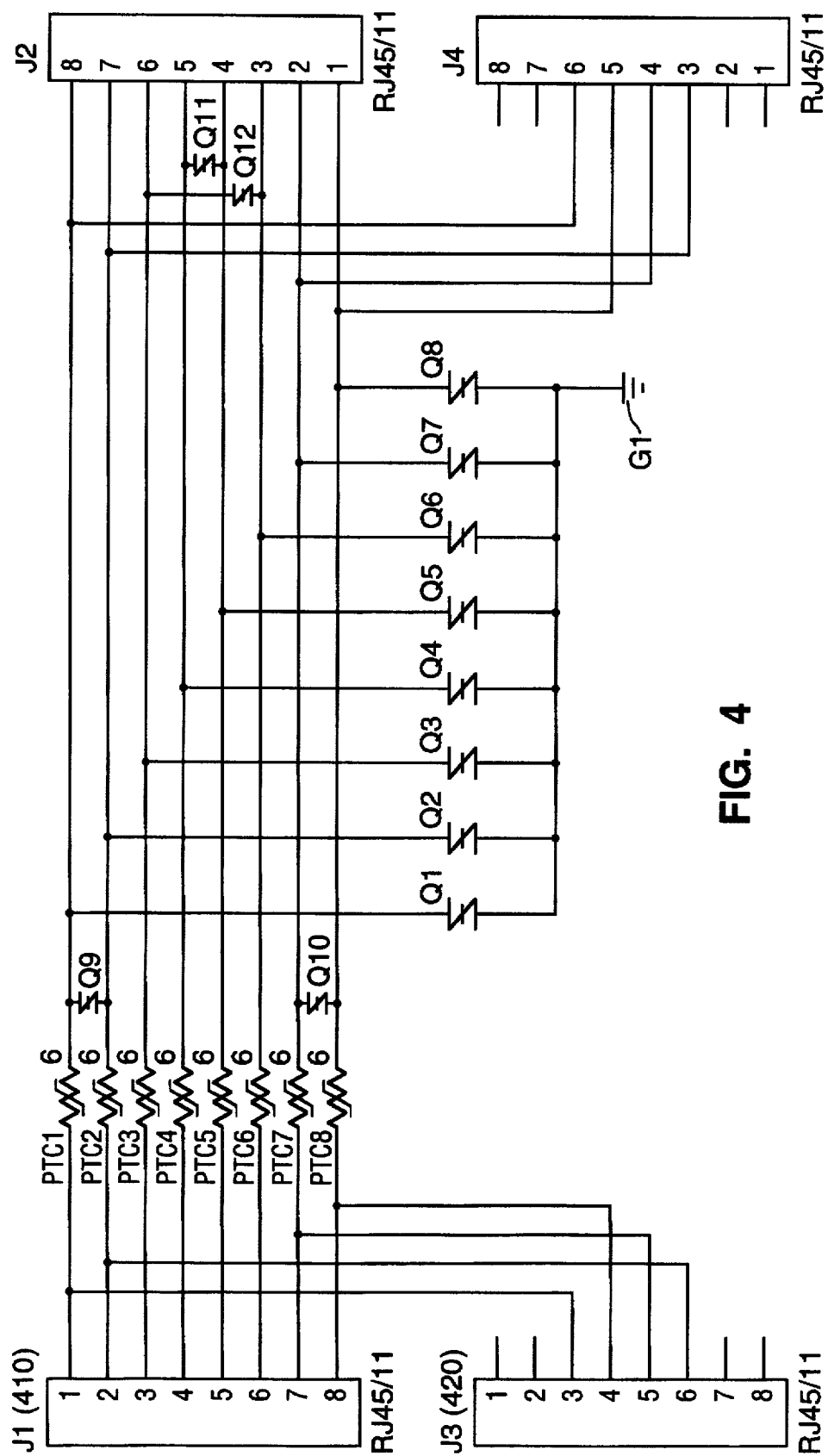
FIG. 4 is a circuit diagram showing the surge protection circuit of the telecommunications line surge protection module shown in FIG. 2.

FIG. 4 shows a circuit diagram for the telecommunications protection module shown in FIG. 2. Input connector J1 (called 410 in the discussion of FIG. 2) is connected to output connector J2 by 8 parallel wires. The eight wires respectively have series-connected 6Ω positive temperature co-efficient resistors PTC1 to PTC8. The eight wires are respectively connected to ground G1 via 8 sidactors Q1 through Q8. This arrangement of resistors and sidactors provides surge protection for each of the 8 wires. By connecting an 8-wire telecommunications line to input connector J1 and output connector J2, surge protection can be provided for an 8-wire telephone line. Of course, other ways of providing surge protection are possible, such as surge protection by zener diodes or metal-oxide varistors. Fuses can also be added to the surge protection circuitry.

The surge protection circuit shown in FIG. 4 also includes input connector J3 (called 420 in FIG. 2) and output connector J4. Four wires of input connector J3 (wires 3 through 6) are connected to four of the eight wires which run between connectors J1 and J2, as shown in FIG. 4. Four wires of output connector J3 (wires 3 through 6) are connected the same four wires which run between connectors J1 and J2, as shown in FIG. 4. Wires 1, 2, 7 and 8 of the connectors J3 and J4 are not connected to anything. By connecting a 4-wire telecommunications line to input connector J3 and output connector J4, surge protection can be provided for a 4-wire telephone line.

Sidactors Q9, Q10, Q11 and Q12 are connected between various wires of the 8 wires which run between connectors J1 and J2. These sidactors are optional, and can be used to limit maximum relative voltage between pairs of wires of connected telecommunications lines.

FIG. 4 shows that the first set of input and output connectors J1 and J2 are connected by eight connected paths each having surge protection circuitry including an in-line resistor and a connection to ground via a sidactor. As shown in FIG. 4, four of these protected paths are also used by the second set of input and output connectors J3 and J4. By commonly using at least some of the protected paths in this manner, telecommunications lines with different numbers of wires (e.g., 8-wire, 4-wire) can be protected by the same surge protector, without the need for separate protected paths (and associated circuitry) for different types of telecommunications lines. Also, as shown in the embodiment of FIG. 4, all 8 protected paths can be utilized, whether the surge protector is used with 4-wire lines, or an 8-wire line.

Looking at FIG. 4, it is readily apparent that an 8-wire telecommunications line should not be connected across connectors J3 and J4, because 4 wires of the 8-wire line would not be connected. Also, it can be seen that a 4-wire telecommunications line should not be connected across connectors J3 and J4, at the same time an 8-wire telecommunications line is connected across connectors J1 and J2. This is because signals from the 4-wire line connected across J3 and J4 are connected to four of the wires connecting J1 and J2. Signals on these four "shared" wires would likely interfere with each other.

However, a 4-wire line can be connected across connectors J3 and J4, while another 4-wire line is connected across connectors J1 and J2, as long as the 4-wire line connected across J1 and J2 utilizes the middle 4 wires 3 to 6 of the connectors J1 and J2. In this way, none of the 8 wires connecting J1 and J2 will be detrimentally "shared".

The maximum number of wires in the aggregate, which can be effectively connected will generally depend on the number of separate protected paths in the surge protection circuitry.

Figure 5:
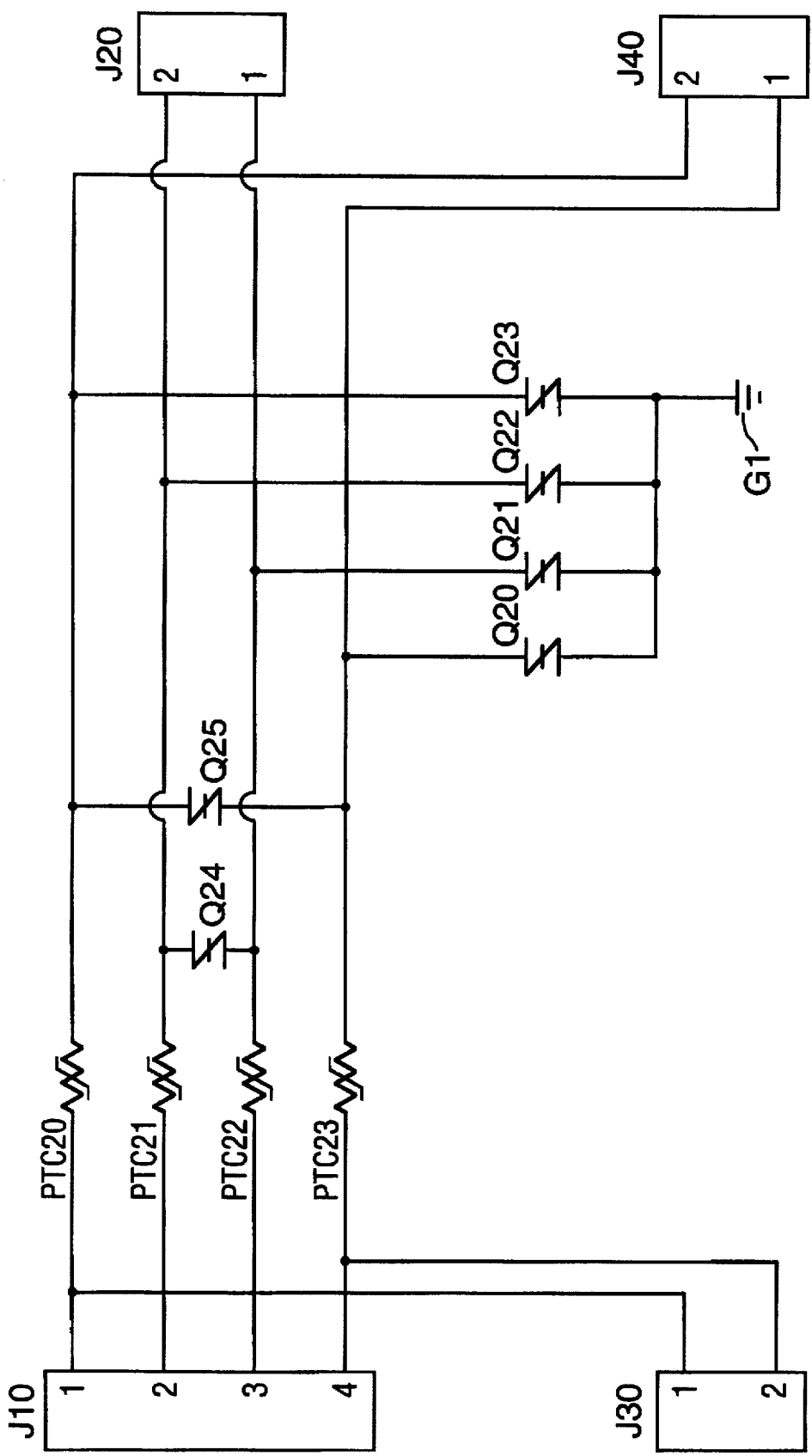
FIG. 5 is a circuit diagram showing the surge protection circuit of a further embodiment of a telecommunications line surge protection module according to the present invention.

A further embodiment of the present invention is shown in FIG. 5. Input connector J10 is an RJ-14 modular jack for connecting a 4-wire telecommunications line. Input connector J30 is an RJ-11 modular jack for connecting a 2-wire telecommunications line. Output connectors J30, J40 are also RJ-11 modular jacks for connecting a 2-wire telecommunications line. Positive temperature coefficient resistors PTC20, PTC21, PTC22 and PTC23, and sidactors Q20, Q21, Q22, Q23 provide surge protection for separate protected paths which connect the input connectors J10, J30 to the output connectors J20, J40. Sidactors Q24, Q25 limit maximum relative voltage between each pair of protected paths.

The embodiment of FIG. 5 can be used in different ways. First, the surge protector of FIG. 5 can be used to split a 4-wire telecommunications line into two 2-wire telecommunications line. This can be done by connecting a 4-wire telecommunications line to input connector J10, and by connecting two 2-wire telecommunications lines to output connectors J20 and J40. In this way, the embodiment of FIG. 5 acts as a "splitter", in addition to providing surge protection. This can be advantageous in that a "splitter" and surge protector can be provided as a single component, in applications where a separate "splitter" component would otherwise be required to divide a larger line into two or more smaller lines.

The embodiment of FIG. 5 can also be used as surge protector for two, 2-wire telecommunications lines, by connecting one 2-wire line to connectors J10 and J20, and another 2-wire line using connectors J30 and J40. When used in either of the two ways described, all four protected paths are utilized.

Figure 6:
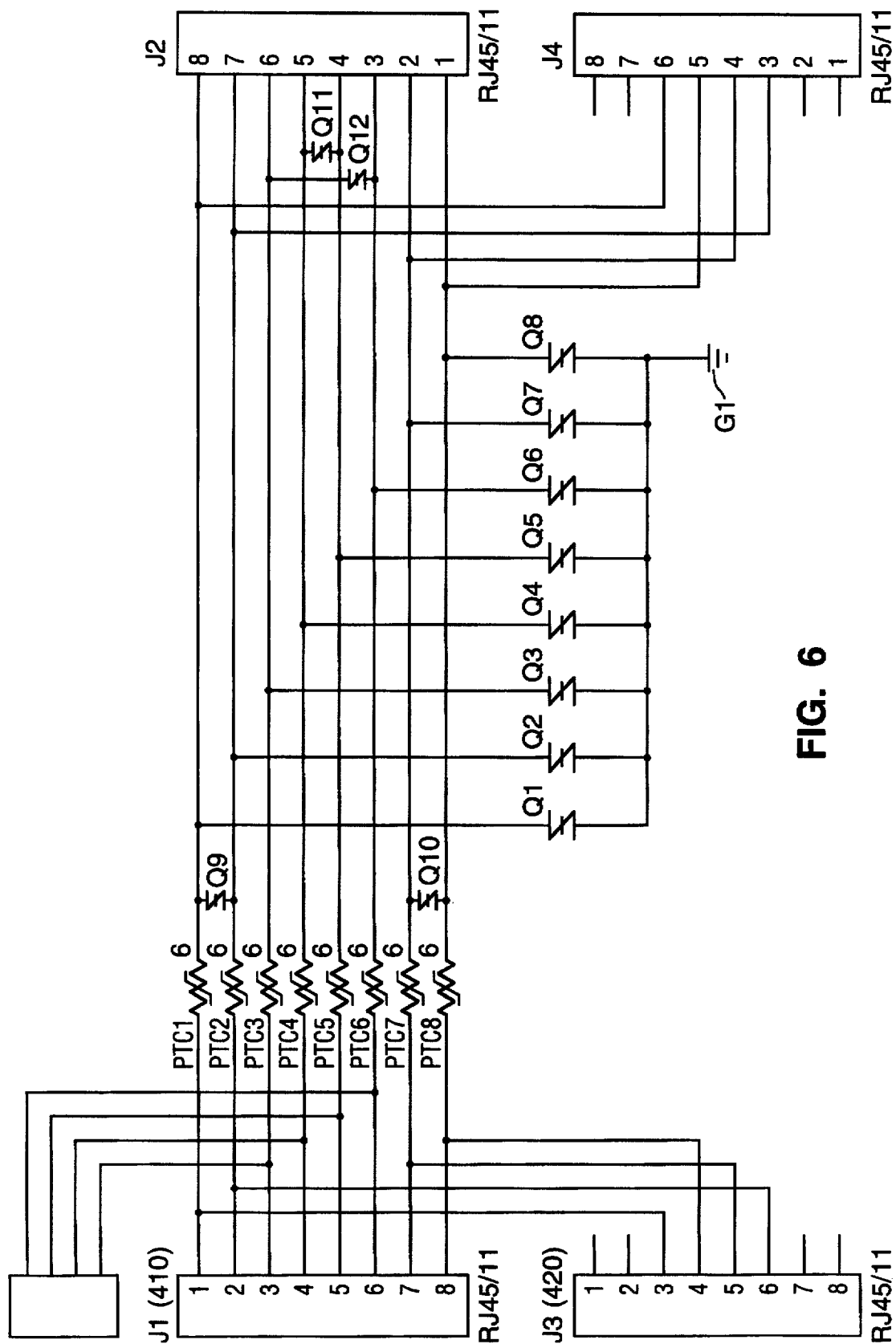
FIG. 6 is a circuit diagram showing another embodiment of a telecommunications surge circuit.

FIG. 6 is a circuit diagram showing another embodiment of a telecommunications surge circuit. FIG. 6 is identical to the circuit shown in FIG. 4 except that the circuit includes a third input connector J5. As shown in FIG. 6, the third input connector is connected to 4 protected paths of the surge protection circuit, where the 4 paths connected to the third input connector are different than the 4 paths connected to the second input connector. While preferred embodiments of the present invention have been described above using illustrative examples, it will be understood by those skilled in the art that the invention is not limited by the illustrative examples and that various changes and modifications may be made without departing from the spirit or scope of the invention as set forth in the following claims.

What is claimed is:

1. A telecommunications line surge protector comprising:
   a first input connector;
   a second input connector; and
   a surge protection circuit having x protected paths, wherein the first input connector is connected to all x paths and the second input connector is connected to y protected paths, where x is an integer greater than one and y is an integer between 1 and (x−1), inclusive.

2. The telecommunications line surge protector according to claim 1, wherein x is 8 and y is 4.

3. The telecommunications line surge protector according to claim 1, wherein x is 4 and y is 2.

4. The telecommunications line surge protector according to claim 1, further comprising a third input connector which is connected to z protected paths of the surge protection circuit, where the z paths connected to the third input connector are different than the y paths connected to the second input connector.

5. The telecommunications line surge protector according to claim 4, wherein y+z is equal to x.

6. The telecommunications line surge protector according to claim 5, wherein x is 8, y is 4 and z is 4.

7. The telecommunications line surge protector according to claim 1, further comprising:
   a first output connector connected to all x paths of the surge protection circuit; and
   a second output connector connected to the y paths of the surge protection circuit which are connected to the second input connector.

8. The telecommunications line surge protector according to claim 1, further comprising:
   a first output connector connected to z paths of the surge protection circuit, where the z paths connected to the first output connector are different than the y paths connected to the second input connector; and
   a second output connector connected to the y paths of the surge protection circuit which are connected to the second input connector.

9. The telecommunications line surge protector according to claim 8, wherein x is 4, y is 2 and z is 2.

10. The telecommunications line surge protector according to claim 1, wherein the x protected paths are respectively electrically connected to ground via a sidactor.

11. A telecommunications line surge protector comprising:
   a first input connector;
   a first output connector;
   a second input connector;
   a second output connector; and
   a surge protection circuit having 8 protected paths respectively electrically connected to ground via a sidactor, wherein the first input and output connectors are connected to all 8 paths and the second input and output connectors are connected to 4 of the 8 protected paths.

12. The telecommunications line surge protector according to claim 11, wherein:
   the first input connector is an RJ-45/11 modular jack;
   the first output connector is an RJ-45/11 modular jack;
   the second input connector is an RJ-45/11 modular jack; and
   the second output connector is an RJ-45/11 modular jack.

13. A telecommunications line surge protector comprising:
   a surge protection circuit having x protected paths
   a first input connector connected to all x protected paths, where x is an integer greater than one; and
   a second input connector is connected to y protected paths, and y is an integer between 1 and (x−1), inclusive.

* * * * *